United States Patent [19]

Ecer

[11] Patent Number: 4,474,861
[45] Date of Patent: Oct. 2, 1984

[54] COMPOSITE BEARING STRUCTURE OF ALTERNATING HARD AND SOFT METAL, AND PROCESS FOR MAKING THE SAME

[75] Inventor: Gunes M. Ecer, Irvine, Calif.

[73] Assignee: Smith International, Inc., Newport Beach, Calif.

[21] Appl. No.: 473,824

[22] Filed: Mar. 9, 1983

[51] Int. Cl.³ .................. F16C 33/24; B23K 26/00
[52] U.S. Cl. ................................ 428/614; 428/627;
219/121 LE; 308/DIG. 8; 384/282
[58] Field of Search ............ 308/DIG. 8; 29/149.55;
219/121 LC, 121 LD, 121 LE, 121 LF;
428/614, 610, 627; 384/282, 283, 284, 285

[56] References Cited

U.S. PATENT DOCUMENTS

| Re. 29,815 | 10/1978 | Gnanamuthu | 219/121 LM |
|---|---|---|---|
| 335,047 | 1/1886 | Torrey | 384/285 |
| 356,331 | 1/1887 | Randolph | 384/283 |
| 1,470,754 | 10/1923 | Kuhne | 428/614 |
| 2,227,307 | 12/1940 | Wabolt | 308/DIG. 8 |
| 2,268,869 | 1/1942 | Given | 384/283 |
| 2,357,578 | 9/1944 | Brownback | 428/614 |
| 2,431,430 | 11/1947 | Shaw | 384/283 |
| 2,757,055 | 7/1956 | Davis | 384/284 |
| 2,971,248 | 2/1961 | Kingsley et al. | 29/149.55 |
| 3,235,316 | 2/1966 | Whanger | 384/95 |
| 3,882,584 | 5/1975 | Tsuya | 29/149.55 |
| 3,938,868 | 2/1976 | Van Wyk | 308/DIG. 8 |
| 3,961,104 | 6/1976 | Tanner | 384/283 |
| 3,985,408 | 10/1976 | Bierlein et al. | 308/DIG. 8 |
| 4,212,900 | 7/1980 | Serlin | 219/121 LF |
| 4,232,912 | 11/1980 | Williamson | 308/DIG. 8 |
| 4,243,867 | 1/1981 | Earle et al. | 219/121 LC |
| 4,406,099 | 8/1983 | Ehrentraut | 384/283 |

FOREIGN PATENT DOCUMENTS

| 57808 | 8/1982 | European Pat. Off. | 384/283 |
|---|---|---|---|
| 2742536 | 3/1978 | Fed. Rep. of Germany | 308/DIG. 8 |
| 524128 | 7/1940 | United Kingdom | 384/283 |
| 683404 | 11/1952 | United Kingdom | 384/283 |
| 718073 | 11/1954 | United Kingdom | 384/283 |

*Primary Examiner*—L. Dewayne Rutledge
*Assistant Examiner*—John J. Zimmerman
*Attorney, Agent, or Firm*—Gabor L. Szekeres

[57] ABSTRACT

A bearing structure having a substrate and a bearing surface of alternating, spaced, hard metal and soft metal areas is disclosed. The hard metal is metallurgically bonded to the base metal substrate by rapidly melting in a predetermined pattern a powdered hardfacing composition disposed on a bearing precursor surface of the base metal substrate. The melting is accomplished by scanning with a laser beam, or like high intensity, concentrated energy source. The melt is allowed to solidify rapidly. Gaps formed between isolated areas of the solidified hard metal are filled with a melt of a soft metal. After solidification of the molten soft metal, the resulting composite structure is machined to a desired depth to provide the composite bearing surface.

30 Claims, 9 Drawing Figures

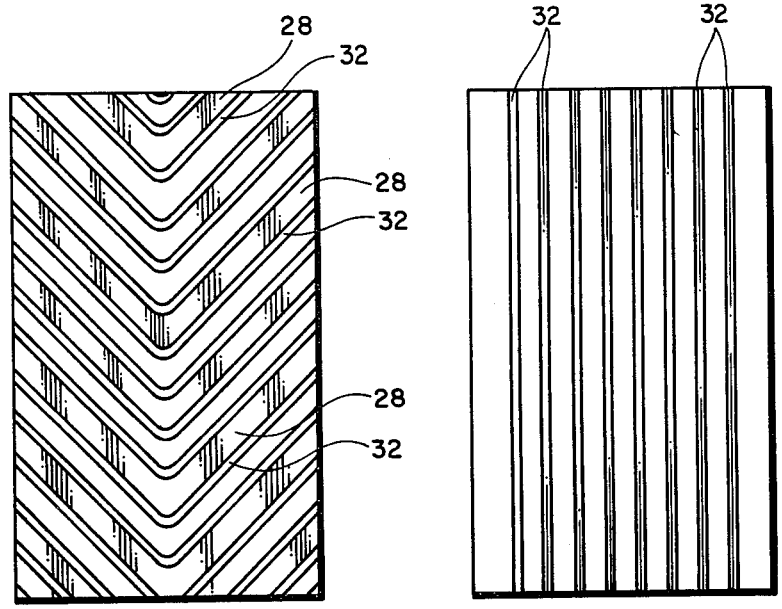
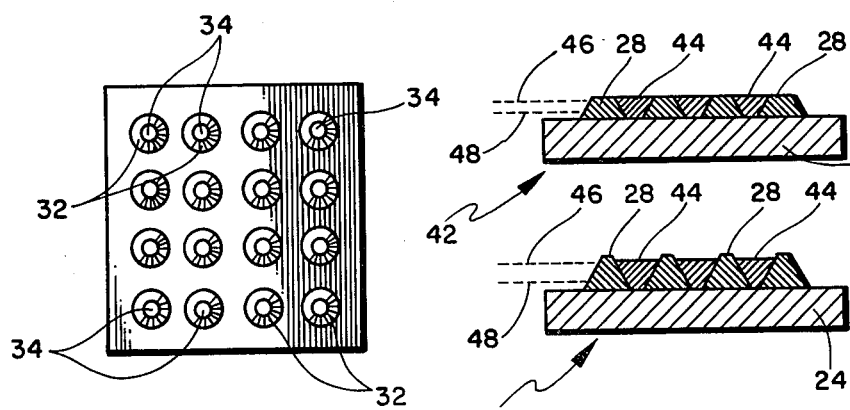
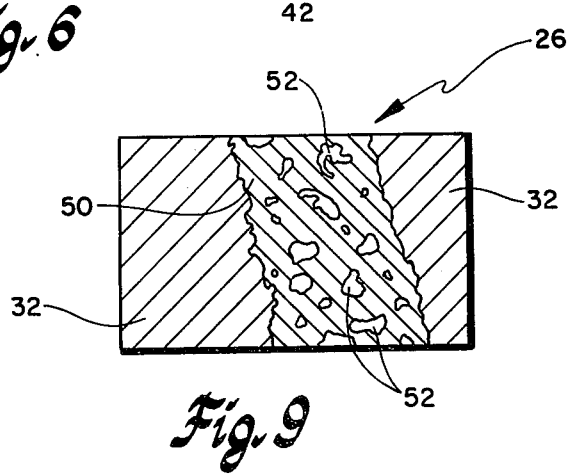

COMPOSITE BEARING STRUCTURE OF ALTERNATING HARD AND SOFT METAL, AND PROCESS FOR MAKING THE SAME

BACKGROUND OF THE INVENTION

1. Field of the Invention

The present invention is directed to a composite bearing structure. More particularly, the present invention is directed to a bearing structure having a bearing surface of alternating hard metal and soft metal areas which are metallurgically bonded to a base metal substrate. The present invention is also directed to a process for making the composite bearing structure.

2. Brief Description of the Prior Art

Bearings adapted for accommodating rotating or lineal motion are well known in the prior art and are practically ubiquitous in machines, engines and like mechanical devices.

Generally speaking, friction bearings incorporate two or more bearing surfaces which are in sliding motion relative to one another. These bearing surfaces optimally should have high load capacity, low friction, minimal wear and long useful life. As is well appreciated by those skilled in the art, the above-noted requirements are especially difficult to satisfy in bearings used in certain harsh environments such as in internal combustion engines and drilling machinery utilized "downhole", when prospecting for oil, gas or minerals.

In its efforts to meet the above-noted and other requirements, and especially for "downhole" and other "severe environment" applications, the prior art has provided bearing surfaces made of materials of very high hardness. Typically, these materials of high hardness are alloys of metal carbides, and are known in the art as "hardfacing" alloys of various proprietory names (such as STELLITE).

Alternatively, the prior art has provided bearing structures wherein one of the two adjacent, slidingly engaging bearing surfaces is made of a soft metal, such as copper, silver, or tin alloys. As still another alternative, the prior art has provided composite bearing surfaces which incorporate alternating soft and relatively hard metal areas exposed for sliding engagement with an adjacent bearing surface. Examples of bearing structures of the above noted and related composite construction, may be found in U.S. Pat. Nos. 3,961,104; 3,235,316; 2,971,248; 2,268,869 and 356,331.

More specifically, U.S. Pat. No. 3,235,316 discloses a composite bearing wherein appropriate recesses are machined into a suitable substrate. Inlays of an "antifriction" or "anti-galling" soft metal compositon are placed into the recesses. The resulting composite bearing surface is said to have improved wear characteristics.

U.S. Pat. No. 2,971,248 discloses a composite bearing wherein a first metal alloy of relatively high load bearing capacity (such as aluminum alloy) is applied to a suitable backing strip or support. Recesses formed in the first metal alloy are mechanically inlaid with a second metal alloy (such as Babbit metal) having anti-seizure qualities.

U.S. Pat. No. 2,268,869 describes bearing structures wherein grooves or recesses machined into a base metal are filled with a mixture of an abrasive metal oxide and a suitable binder, such as sodium silicate. The resulting bearings are said to have improved load bearing capacity.

A principal disadvantage of the prior art composite bearing structures is that the grooves or recesses which accept the "second" material to form the composite, are mechanically placed or machined into the base or substrate metal. Understandably, machining the recesses into the substrate is costly, rendering the prior art composite bearings relatively uneconomical.

Another disadvantage of prior art composite bearing structures is that one of the materials of the composite bearing surface is necessarily the very material of the base or substrate. This disadvantage inherently flows from the hitherto known methds for fabricating the composite bearings. Thus, the hitherto known composite bearings fail to take advantage of specialized hardfacing alloy compositions which are available in the art to provide extra hard, thin surfaces on less expensive metal based substrates.

The present invention is designed to overcome the problems experienced in the prior art regarding high costs of composite bearings, and to provide for the first time, a composite bearing which utilizes specialized hardfacing alloys in conjunction with soft metals to provide an improved bearing surface.

SUMMARY OF THE INVENTION

It is an object of the present invention to provide a composite bearing structure of improved load bearing and wear characteristics.

It is another object of the present invention to provide a bearing structure wherein a hardfacing metal is utilized together with a soft metal on a base metal substrate to form a composite bearing surface.

It is still another object of the present invention to provide a composite bearing structure wherein the hardfacing metal is metallurgically bonded to the underlying base metal substrate.

It is yet another object of the present invention to provide a relatively economical process for fabricating a composite bearing surface composed of alternating hard metal and soft metal areas on an underlying base metal substrate.

These and other objects and advantages are attained by a bearing structure wherein a hardfacing metal or like hard metal composition is metallurgically bonded in a predetermined pattern to a bearing precursor or support surface of a base metal substrate. The predetermined pattern is configured to provide isolated areas of the hardfacing metal which protrude from the underlying base metal surface. Gaps between the isolated areas contain a soft metal of a hardness of at least five Rc units less than the hardfacing metal.

An appropriately machined bearing surface of the alternating hard metal and soft metal areas provides improved load bearing and wear characteristics. These characteristics are due to the good heat conducting ability of the soft metal, entrapment of hard metal particles in the soft metal during use of the bearing structure, and the high load capacity and structural integrity of the isolated hard metal areas. These areas have high structural integrity because of the novel manner provided by the present invention for establishing them on the base metal substrate.

In the process of the present invention, a powdered hardfacing composition is deposited on the bearing support surface of the base metal substrate. The hardfacing composition is scanned in the predetermined pattern by a high intensity energy source, such as a laser beam, to cause rapid localized melting of the hardfacing composition and metallurgical bonding to the underlying base metal. Subsequent rapid cooling of the melt in the isolated areas of the predetermined pattern permits an unconstricted solidification of the hardfacing metal with the resulting high structural integrity. After bonding of the hardfacing metal composition to the base metal substrate, gaps between isolated areas of the hardfacing metal are filled with a melt of the soft metal. The joint hardfacing metal-soft metal layer is then machined to a desired depth to expose the alternating hard metal-soft metal areas and to form the bearing surface.

The features of the present invention can be best understood together with further objects and advantages, by reference to the following description, taken in connection with the accompanying drawings wherein like numerals indicate like parts.

BRIEF DESCRIPTION OF THE DRAWINGS

FIG. 4 is a schematic top view of an intermediate product wherein the hardfacing metal composition has been metallurgically bonded to the base metal substrate in a predetermined pattern of a first preferred configuration;

FIG. 5 is a schematic top view of an intermediate product wherein the hardfacing metal composition has been metallurgically bonded to the base metal substrate in a predetermined pattern of a second preferred configuration;

FIG. 6 is a schematic top view of an intermediate product wherein the hardfacing metal composition has been metallurgically bonded to the base metal substrate in a predetermined pattern of a third preferred configuration;

FIG. 7 is a schematic cross sectional view of an intermediate product obtained in the process of the present invention wherein a hardfacing metal composition has been metallurgically bonded in a predetermined pattern to a base metal substrate, and gaps between areas of the hardfacing metal have been filled with a soft metal;

FIG. 8 is a schematic cross-sectional view of another intermediate product obtained in the process of the present invention, wherein a hardfacing metal composition has been metallurgically bonded in a predetermined pattern to a base metal substrate and gaps between areas of the hardfacing metal have been filled with a soft metal, and FIG. 9 is a schematic illustration of an electron microscope view of a composite bearing surface of the present invention; the view having been taken after a wear test, illustrating a soft metal area between two hard metal areas and showing debris of hard metal particles embedded in the soft metal area.

DESCRIPTION OF THE PREFERRED EMBODIMENTS

Figure 1:
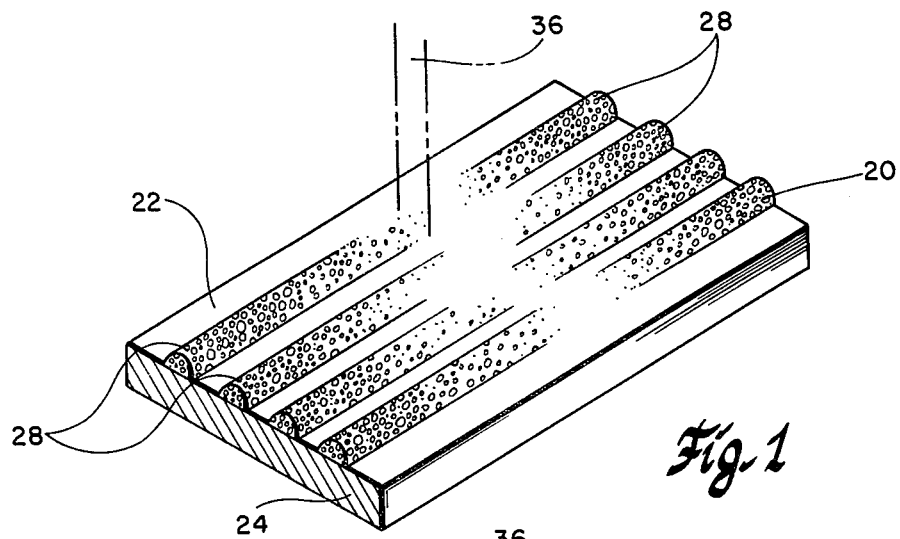
FIG. 1 is a schematic perspective view of a base metal substrate having a powdered hardfacing metal composition deposited thereon in a predetermined pattern; the Figure also shows schematically a step of the process of the present invention wherein a laser beam is applied to melt the hardfacing metal composition in the predetermined pattern.

The following specification taken in conjunction with the drawings sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

In accordance with the present invention, a hard metal composition 20 is metallurgically bonded to a suitably formed support or bearing precursor surface 22 of a base metal substrate 24. For simplicity of illustration the base metal substrate 24 is schematically shown on the drawing figures as a rectangular plate having a flat bearing support or precursor surface 22. In actual practice of the present invention, however, the base metal substrate 24 and its bearing support surface 24 correspond to the configuration of the machine part (not shown) or bearing assembly (not shown) on which the composite bearing surface 26 of the present invention is to be formed. Thus, as it will be apparent to those skilled in the art, the bearing support surface 22 may be a curvilinear surface (not shown).

The base metal substrate 24 comprises materials which are ordinarily used in the art for manufacturing machine parts, (not shown) and bearing assemblies (not shown). Thus, the substrate 24 may be made of various steel alloys, other ferrous metal alloys, nickel, nickel based alloys, cobalt, cobalt based alloys, copper and copper based alloys. The principal requirement in this regard is determined by the nature of the machine part (not shown) in which the novel composite bearing surface 26 of the present invention is incorporated.

Referring now principally to FIG. 1, a step in the novel process of fabricating the bearing surface 26 of the present invention is schematically shown. Thus, a powdered hard metal composition 20 is deposited on the bearing support surface 22, and a concentrated beam of energy is applied in a predetermined pattern to rapidly melt the deposited hard metal composition 20 to provide isolated areas of hard metal metallurgically bonded to the underlying support surface 22. The hard metal composition 20 utilized for the purposes of the present invention is usually of greater hardness than the underlying substrate 24.

A variety of commercially availabe hard metal compositions, commonly known in the art as hardfacing compositions, are suitable for application in the present invention. Generally speaking, such hardfacing compositions are either metal carbide based compositions, or intermetallic hardfacing alloys. These materials are well known to those skilled in the art under various proprietory names, such as STELLITE alloys, HAYNES alloys, DELCROME alloys and TRIBALOY alloys. STELLITE alloys are examples of a carbide based hardfacing alloys, whereas TRIBALOY alloys are examples of intermetallic hardfacing alloys.

A specific example of a carbide based hardfacing alloy eminently suitable for use in the present invention is STELLITE alloy No. 1, the nominal chemical composition of which (in percentages of weight) is: Chromium 30%; Carbon 2.5%; Silicon 1%, Manganese up to a maximum of 1%; Molybdenum up to a maximum of 1%; Iron up to a maximum of 3%; Nickel up to a maximum of 3%; Tungsten 12.5%, with the balance being Cobalt.

A specific example of an intermetallic hardfacing alloy suitable for use in the present invention is TRIBALOY No. T-400, the nominal chemical composition of which (in percentages of weight) is: Chromium 8.5%; Carbon up to a maximum of 0.08%; Silicon 2.6%; Molybdenum 28.5%; Nickel and Iron jointly up to a maximum of 3%, with the balance being Cobalt.

FIG. 1 illustrates one specific manner of applying the powdered hardfacing composition 20 to the bearing support surface 22. The powdered hardfacing composition 20 is deposited in substantially parallel, elongated, spaced strips 28 on the bearing precursor surface 22 before the concentrated beam of energy is applied to melt the strips 28.

Another, preferred manner of depositing the hardfacing composition 20 on the bearing precursor surface 22 is to utilize a powder feeding apparatus (not shown) often used in conjunction with laser welding apparatus (not shown). Such apparatus are well known to those skilled in the metallurgical arts, and are commercially available. They are similar in construction and operation to the apparatus described in U.S. Pat. No. 4,243,867, the specification of which is hereby expressly incorporated by reference.

When a powder feeding apparatus (not shown) is utilized in the process of the present invention, the powdered hardfacing composition 20 is deposited from the apparatus (not shown), into the path of a laser beam. The deposited powder is substantially immediately impacted with the laser beam and melted thereby. Using the powder feeding apparatus together with the laser beam in the process of the present invention can be characterized as substantially simultaneously depositing and melting the powdered hardfacing composition 20 on the surface 22.

Figure 2:
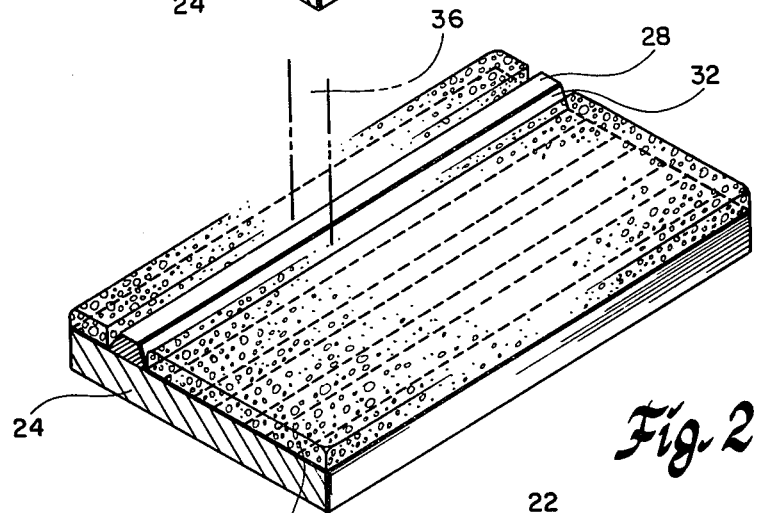
FIG. 2 is a schematic perspective view of a base metal substrate having deposited thereon a layer of powdered hardfacing metal composition mixed with a suitable binder; the Figure also shows schematically the step of the process of the present invention wherein a laser beam is applied to melt the hardfacing metal composition in the predetermined pattern.

Referring now to FIG. 2, yet another preferred mode is shown for depositing the hardfacing composition 20 on the bearing precursor surface 22. The powdered hardfacing composition 22 is intermixed with a suitable binder (not shown) to form a paste (not shown). The paste (not shown) is placed as a layer 30 on the bearing precursor surface 22. The binder (not shown) may be a volatile solvent, such as ethyl, isopropyl or n-butyl alcohol. Alternatively, the binder (not shown) may be cellulose acetate and other cellulose based or like non-volatile binding material.

The binder (not shown), however, is preferably removed from the hardfacing metal composition 20 before the composition 20 is melted by application of the high energy beam. As it will be readily appreciated by those skilled in the art, a volatile solvent binder (not shown) is readily removed from the hardfacing composition 20 by evaporation. The evaporation may be facilitated by heating in a furnace (not shown) or the like. A non-volatile binder (not shown), such as cellulose acetate, may be burnt-off by baking in the furnace (not shown) or the like.

Other methods for depositing the powdered hardfacing metal composition 20 on the bearing precursor surface 22 involve painting or spraying a paste (not shown) of the composition 20 (mixed with a binder) on the surface 22, or dipping the substrate 24 into the paste (not shown). Still other methods for applying the hardfacing composition 20 to the bearing precursor surface 22 may become apparent to those skilled in the art in light of the present disclosure.

In order to remove residual moisture, it is advantageous to subject the composition 20, after it had been deposited in the bearing precursor surface 22, to temperatures up to approximately 300 degrees F. This is helpful even when a volatile binding agent is not used. When a volatile binder is used, this step helps to remove last residues of the volatile binder.

In accordance with an important feature of the present invention, the hardfacing metal composition 20 is rapidly melted on the bearing precursor surface 22 and is permitted to rapidly solidify in an unconstricted manner, in order to obtain a strong metallurgical bond between the hardfacing metal 20 and the underlying base metal of the substrate 24. The foregoing is accomplished by scanning the powdered hardfacing composition 20 with the above-noted high intensity energy source or beam in a predetermined pattern only, so as to melt the hardfacing metal 20 only in areas isolated from one another. On FIGS. 2 through 8, the solidified hardfacing metal areas bear the reference numeral 32.

Isolated areas 32 of the hardfacing metal fused or metallurgically bonded to the bearing precursor surface 22 may be in the configuration of elongated strips 28, shown on FIGS. 1, 2, 3, and 4, a chevron like pattern of strips 28 (FIG. 5), or in islands 34. The islands 34 are best obtained by using a pulsating laser beam. The islands 34 may be round, as shown on FIG. 6, or substantially rectangular (not shown).

Typical width of the strips 28 of the solidified areas 32 of the hardfacing metal 20 is between $\frac{1}{8}''$ to $\frac{1}{4}''$, whereas separation between adjacent strips 28 is typically between $1/32''$ to $\frac{1}{8}''$. Height of the solidified hardfacing metal areas 32 or strips 32 protruding from the underlying substrate 24 depends on the desired qualities of the final bearing structure to be obtained in accordance with the present invention. Typically, the height is between $1/16''$ to $\frac{1}{8}''$. In order to obtain a solid hardfacing metal area 32 of any desired height, the deposited paste of hardfacing composition 20 (before melting) must be approximately twice the desired height.

FIG. 2 schematically shows a solidified hardfacing metal strip 28 formed from the layer 30 of hardfacing composition paste by passage of an appropriate high intensity energy beam. The phantom lines of FIG. 2 indicate rowsor lines where the energy beam is to be passed to obtain more, parallel disposed, solid hardfacing metal strips 28.

Presently available state-of-the-art laser devices can be utilized for providing the scanning energy beam necessary for practicing the process of the present invention. Such laser devices are available e.g. from the Industrial Laser Division of Spectra-Physics Corporation, Mountain View, Calif. These laser devices are well known by those skilled in the metallurgical arts, and are presently used for laser welding, cladding, cutting and like applications.

In connection with the foregoing, it is noted that whereas use of a laser beam is preferred in the melting step of the process of the present invention, other energy sources can also be used. The principal requirement in this regard is for a concentrated, intense heat or energy source which rapidly melts the hardfacing metal composition 20 on the surface 22 of the substrate 24, and thereafter permits it to solidify rapidly in a substantially unconstricted manner. Certain electron beam emitting devices satisfy this requirement. As still another possibility, gas tungsten arc welding devices may also be utilized.

As is known in the established art of laser welding, the application of the laser beam to effect fusion of two metal objects must be performed under a protective blanket of an inert gas, such as argon. Therefore, in the present invention also, an argon blanket is used during the laser beam scanning step.

Fusion or metalluragical bonding of the hardfacing metal composition 20 to the base metal substrate 24 in isolated areas only, by a high intensity energy beam, such as the laser beam, provides the the resulting solid hardfacing metal areas 32 with excellent structural integrity. Furthermore, the metallurgical bond between the hardfacing metal areas 32 and the underlying substrate 24 is very good. Because the solid hardfacing metal areas 32 are narrow, cooling stresses are minimized, and there is only a low level of dilution of the hardfacing metal areas with the base metal of the substrate 24. Still further, the laser beam 36 passes only once upon each area of hardfacing composition, and therefore avoids tempering the solidified areas 32 with repeated or prolonged heat contact.

The foregoing advantages are in contrast with the characteristics of the laser fused continuous hardfacing metal surface described in U.S. Pat. No. 4,243,867 and U.S. Pat. No. Re. 29,815. In these and other prior art continuous hardfacing material deposits, the cooling stresses are large. These stresses often cause cracking of the deposited hard surface, particularly when the "hard" carbide, boride, or nitride content of the hardfacing composition is high. Because cooling stresses are minimized in accordance with the present invention, the hardfacing materials used in the present invention may have relatively high "hard" material (such as carbide) contents.

Figure 3:
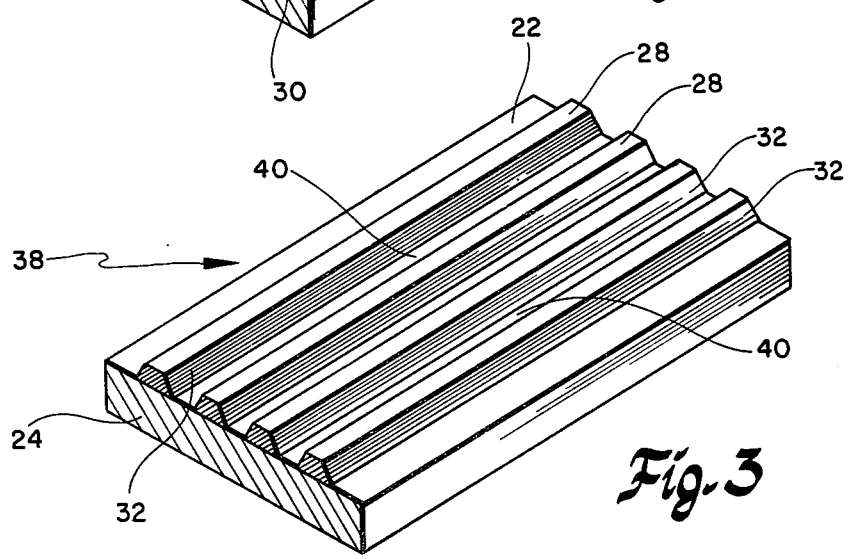
FIG. 3 is a schematic perspective view of an intermediate product obtained in the process of the present invention wherein a hardfacing metal composition has been metallurgically bonded to a base metal substrate by a laser beam of substantially rectangular energy profile.

Referring now to FIG. 3, an intermediate product 38 is shown which is obtained in accordance with the present invention. In this intermediate 38, several strips 28 of the hardfacing metal composition are metallurgically bonded to the underlying surface 22 of the substrate 24. As shown, the strips 28 of the solidified hardfacing metal areas 32 have a somewhat trapezoidal cross-section. This is a typical cross-section formed when the laser beam 36 utilized for creating the strips 28 has a substantially square energy profile.

The intermediate product 38 shown on FIG. 3, has no excess powdered or pasty hardfacing composition 20 on the substrate surface 22. This is, because any excess hardfacing composition 20 has been removed in an intermediate step of the process by simple brushing, blowing or like operation. Excess hard metal splashings located in gaps 40 between the strips 28 are also removed from the base metal substrate 24 by grinding, and the hard metal strips 28 are deburred in additional intermediate steps.

Referring now to FIGS. 7 and 8, still further intermediate products 42 are shown which are obtained in the course of practicing the process of the present invention. After the intermediate steps noted above, the gaps 40 between the protruding solid, hard metal areas 32 are filled with a melt of a soft metal 44. In order to obtain the composite bearing surface 26 of the present invention, the soft metal 44 should have an Rc hardness of at least five (5) Rc units less than the hardness of the solid hardfacing metal areas 32. Suitable soft metals include commonly known brazing and bearing metals and alloys, such as silver, silver based alloys, copper, copper based alloys, tin, tin based alloys, nickel, nickel based alloys, lead and lead base alloys.

The manner of filling the gaps 40 with the soft metal 44 is not critical. The soft metal 44 may be applied to the hardfacing metal areas 32 bearing surface 22 of the substrate 24 in the form of a powder, strips or rods (not shown) of soft metal 44, or the like. The soft metal 44 is then melted in a furnace (not shown), under a welding torch (not shown), or by laser or electron beams.

After the melt of the soft metal 44 had solidified thereby filling the gaps 40, the intermediate product 42 is machined in a conventional manner to provide the composite bearing surface 26 of the present invention.

With particular reference again to FIGS. 7 and 8, several possible depths of machining are noted. It is apparent, that different depths of machining remove differing amounts of metal from the composite structure. FIGS. 7 and 8, each show schematically, as examples, two (2) different planes 46 and 48 to which the composite bearing may be machined down.

An inspection of these Figures reveals that the ratio of exposed hard metal areas 32 to soft metal areas 50 in the final bearing surface 26 depends on several factors. These factors include the dimensions and spacing of the hard metal composition 20 on the bearing precursor surface 22, and the depth of machining which is performed in the final step of the process. Furthermore, the ratio of hard to soft metal areas 32 and 50 also depends on the energy profile of the laser beam 36 which is used in the scanning or melting step. As noted above, when the beam 36 is of a substantially square energy profile, the solidified hard metal strips 28 have the trapezoidal cross-section indicated on FIG. 7. When the laser beam 36 has an energy profile configured substantially as a Gaussian curve, the resulting hard metal strips 28 have a configuration which is schematically indicated on FIG. 8.

FIG. 9 shows an electronmicroscope view of a portion of the composite bearing surface 26 of a sample which was prepared in accordance with the present invention, and was wear tested. Dark areas on the Figure indicate hard metal surfaces 32, and the white area indicates a soft metal surface 50. Dark spots in the white area of the Figure indicate hard metal particles 52 which were abraded from the bearing surface 26 during wear, and were trapped in the soft metal surface area 50. This represents another advantage of the novel bearing structure of the present invention. As is known, abraded hard metal particles 52 can cause serious damage when they remain between slidingly engaging bearing surfaces. By trapping the abraded hard metal particles in the soft metal areas, the bearing surface of the present invention eliminates or minimizes the above noted source of damage.

In summary, the composite bearing surface of the present invention has improved wear characteristics, because the hard areas 32 have increased structural integrity and hardness, the soft metal areas 50 act as effective heat sinks, abraded hard metal particles are trapped in the soft metal, and certain soft metal compositions have good lubricating properties. Whereas, the improved bearing surface or structure of the present invention has many applications, it is especially advantageously used in valve seats, rock bit bearings, engine and crankshaft bearings, and in internal surfaces of cylinders and pistons.

The following specific example describes in detail the preparation of a sample bearing surface or structure of the present invention. It should be remembered, however, that rather than the ensuing detailed example, solely the claims measure the scope of the present invention.

SPECIFIC EXAMPLE

An AISI 4581 steel block of 4.00"×100"×0.04" dimensions had a depression or channel of 0.625" width and 0.04" depth machined in one of its elongated face. Nominal chemical composition of the AISI 4815 steel (in percentages of weight) is as follows: Carbon 0.13–0.18%; Manganese 0.40–0.60%; Silicon 0.15–0.30%; Nickel 3.25–3.75%; Molybdenum 0.20–0.30%; Phosphorous up to a maximum of 0.035%; Sulphur up to a maximum of 0.040%, with the balance being Iron.

The machined channel in the steel block was filled with a powder of STELLITE No. 1 hardfacing composition, having an average particle size of approximately 50 μm. The steel block inlaid with the powdered hardfacing composition, was placed on a movable table. In one sample two (2), in another sample three (3) strips of the powdered hardfacing composition were melted under a laser beam of 5 KW energy output. During the melting process the table moved the sample at a rate of 15"/min., and the laser beam diameter on the powder surface was 7.00 mm (0.28"). The melting was performed under a protective shroud of argon gas. The melted strips quickly solidified into solid, hard hardfacing metal strips strongly bonded to the underlying steel.

Excess, unsolidified hardfacing powder was removed, and hard metal splashings between the strips were removed by a grinder. An aluminum bronze alloy was melted with an oxygen-acetylene torch to overlay the strips and fill the gaps between the strips. The aluminum bronze alloy had the following nominal chemical composition (in percentages of weight): Aluminum 14.5%; Iron 4% with the balance being Copper.

The composite deposits of STELLITE and aluminum bronze were machined to produce a flat surface of an 8 to 10 RMS finish. The surface showed the alternating layers of STELLITE No. 1 and aluminum-bronze. Sample blocks were cut from the finished steel blocks for wear testing.

What is claimed is:

1. A composite metal member suitable for providing a bearing of improved wear characteristics, the member comprising:
    a substrate of a base metal composition, having a bearing precursor surface;
    a plurality of spaced areas of a hard metal composition, the spaced areas of the hard metal composition having been metallurgically bonded to the bearing precursor surface in a substantially molten state of the hard metal composition, the spaced areas protruding from the bearing precursor surface, each area of hard metal composition being substantially entirely isolated from all other areas of hard metal composition thereby forming gaps between said protruding areas, and
    a soft metal composition disposed on the bearing precursor surface to substantially fill the gaps between the protruding areas of the hard metal composition, the combined spaced areas of the hard metal composition and the soft metal composition adapted for being machined into a bearing surface.

2. The composite metal member of claim 1 wherein the areas of hard metal composition are substantially regularly spaced.

3. The composite metal member of claim 2 wherein the areas of hard metal composition comprise substantially continuous strips.

4. The composite metal member of claim 2 wherein the areas of hard metal composition comprise islands.

5. The composite metal member of claim 1 wherein the base metal composition is selected from a group consisting of ferrous metals, ferrous metal based alloys, nickel, nickel based alloys, cobalt, cobalt based alloys, copper and copper based alloys.

6. The composite metal member of claim 1 wherein the hard metal composition is a hardfacing alloy selected from a group consisting of metal carbide based hardfacing alloys and intermetallic alloys.

7. The composite metal member of claim 1 wherein the soft metal composition has an Rc hardness at least approximately 5 units less than the Rc hardness of the hard metal composition.

8. The composite metal member of claim 1 wherein the soft metal composition is selected from a group consisting of copper, copper based alloys, silver, silver based alloys, tin, tin based alloys, lead, and lead based alloys.

9. A composite metal bearing comprising:
    a substrate member of a base metal composition including a support surface underlying a bearing surface;
    a plurality of spaced areas of a hardfacing metal different in composition than the base metal composition, said spaced areas of the hardfacing metal having been metallurgically bonded to the support surface of the substrate in a substantially molten state of the hardfacing metal, protruding from the support surface, and being isolated from one another so as to form gaps between adjacent areas, and
    a soft metal composition having a hardness of at least five Rc units less than the hardness of the hardfacing metal, the soft metal being disposed on the support surface in the gaps among the spaced areas of hardfacing metal and substantially entirely filling said gaps, the areas of the hardfacing metal and the soft metal jointly comprising the bearing surface.

10. The composite metal bearing of claim 9 wherein the gaps between areas of the hardfacing metal are approximately of 1/32" to ⅛" magnitude.

11. The composite metal bearing of claim 9 wherein the areas of hardfacing metal comprise substantially elongated strips being approximately ⅛"–¼" wide.

12. The composite metal bearing of claim 9 wherein the base metal composition is selected from a group consisting of ferrous metals, ferrous metal based alloys, nickel, nickel based alloys, cobalt, cobalt based alloys, copper and copper based alloys, the hardfacing metal is selected from a group consisting of carbide based hardfacing alloys and intermetallic hardfacing alloys, and the soft metal is selected from a group consisting of copper, copper based alloys, silver, silver based alloys, tin, tin based alloys, nickel, nickel based alloys, lead and lead based alloys.

13. A composite metal bearing have a bearing surface of alternating areas of a hardfacing metal composition and a soft metal composition, prepared by the process comprising the steps of:
depositing a powdered hardfacing metal composition on a suitable bearing precursor surface of a metal substrate of a base metal composition;
scanning with a high intensity energy source the powdered hardfacing composition in a predetermined pattern to cause rapid localized melting of the hardfacing composition in the predetermined pattern and to form in the predetermined pattern a metallurgical bond between the hardfacing composition and the substrate, the predetermined pattern being configured to provide spaced areas impacted by the energy source;
permitting rapid cooling of the molten hardfacing composition whereby isolated spaced areas of solid hardfacing composition are formed which protrude from the precursor surface in the predetermined pattern;
substantially filling all gaps between the protruding areas of the hardfacing composition with a melt of a soft metal composition;
permitting the melt of the soft metal to solidify, and
removing a layer of the hardfacing composition and of the soft metal composition to provide the bearing surface of the alternating areas of hardfacing metal and soft metal.

14. The composite metal bearing of claim 13 prepared by the process wherein the powdered hardfacing composition is deposited on the precursor surface in a substantially uniform layer, and wherein after the step of rapid cooling of the molten hardfacing composition the process further comprises the step of removing remaining powdered hardfacing composition from the bearing precursor surface.

15. The composite metal bearing of claim 14 wherein the powdered hardfacing composition is intermixed with a suitable binder for the step of depositing on the precursor surface.

16. The composite metal bearing of claim 15 wherein the binder is a volatile solvent.

17. The composite metal bearing of claim 15 wherein the binder is cellulose acetate.

18. The composite metal bearing of claim 13 prepared by the process wherein the step of depositing the powdered hardfacing composition and the step of scanning with a high intensity energy source are conducted substantially simultaneously.

19. The composite metal bearing of claim 13 wherein bearing surface is substantially parallel with the underlying bearing precursor surface of the metal substrate.

20. The composite metal bearing of claim 13 wherein the high intensity energy source used in the step of scanning is a laser beam.

21. The composite metal bearing of claim 13 wherein the base metal composition is selected from a group consisting of ferrous metals, ferrous metal based alloys, nickel, nickel based alloys, cobalt, cobalt based alloys, copper and copper based alloys, the hardfacing metal is selected from a group consisting of carbide based hardfacing alloys and intermetallic hardfacing alloys, and the soft metal is selected from a group consisting of nickel, nickel based alloys, copper, copper based alloys, silver, silver based alloys, tin, tin based alloys, lead and lead based alloys.

22. A process for preparing a composite metal bearing, comprising the steps of:
depositing a hardfacing metal composition on a suitable bearing precursor surface of a substrate member of a base metal composition;
scanning with a high intensity energy source the hardfacing composition in a predetermined pattern to cause rapid localized melting of the hardfacing composition in the predetermined pattern and to form in the predetermined pattern a metallurgical bond between the hardfacing composition and the substrate, the predetermined pattern being configured to provide spaced areas impacted by the energy source;
permitting rapid cooling of the molten hardfacing composition whereby isolated, spaced areas of solid hardfacing composition are formed which protrude from the precursor surface in the predetermined pattern;
substantially filling all gaps between the protruding areas of the hardfacing composition with a melt of a soft metal composition;
permitting the melt of the soft metal to solidify, and
removing a layer of the hardfacing composition and of the soft metal composition to provide a bearing surface of alternating areas of hardfacing metal and soft metal.

23. The process of claim 22 wherein the high intensity energy source used in the step of scanning, is a laser beam.

24. The process of claim 22 wherein the step of depositing the hardfacing metal composition and the step of scanning are conducted substantially simultaneously.

25. The process of claim 22 where in the step of depositing, the hardfacing metal composition is mixed with a suitable binder, and the step of scanning is conducted after the step of depositing.

26. The process of claim 22 where in the step of depositing, the hardfacing metal composition is deposited on the bearing precursor surface as a substantially uniform layer covering said precursor surface; the step of scanning is conducted after the step of depositing, and wherein after the step of rapid cooling the process further comprises a step of removing loose hardfacing composition remaining on the bearing precursor surface.

27. The process of claim 22 wherein the step of scanning is conducted in a predetermined pattern configured for providing substantially parallel disposed, substantially regularly spaced strips on the precursor surface in which the hardfacing metal composition is to be impacted by the high intensity energy source and to be melted thereby.

28. The process of claim 22 wherein the step of scanning is conducted in a predetermined pattern configured for providing isolated, substantially regularly spaced islands on the precursor surface in which the hardfacing composition is to be impacted by the high intensity energy source and is to be melted thereby.

29. The process of claim 22 wherein the step of removing is conducted to provide a bearing surface disposed substantially parallel with the underlying precursor surface.

30. The process of claim 22 wherein the base metal composition is selected from a group consisting of ferrous metals, ferrous metal based alloys, nickel, nickel based alloys, cobalt, cobalt based alloys, copper, and copper based alloys, the hardfacing metal composition is selected from a group consisting of carbide based hardfacing alloys, and intermetallic hardfacing alloys, and the soft metal is selected from a group consisting of nickel, nickel based alloys, copper, copper based alloys, silver, silver based alloys, tin, tin based alloys, lead, and lead based alloys.

* * * * *